United States Patent [19] [11] 4,001,495

Tauszig [45] Jan. 4, 1977

[54] DEVICES FOR THE COPYING OF IMAGES BY SEQUENTIAL SWEEPING

[75] Inventor: Julio G. Tauszig, Buenos Aires, Argentina

[73] Assignee: A. B. Dick Company, Chicago, Ill.

[22] Filed: June 19, 1975

[21] Appl. No.: 588,312

[30] Foreign Application Priority Data

July 15, 1974 Argentina .......................... 254689

[52] U.S. Cl. ................................ 358/294; 358/297

[51] Int. Cl.² ...................... H04N 1/06; H04N 1/24

[58] Field of Search .......... 178/6.6 R, 6.6 A, 6.6 B, 178/6.7 R, 7.1, 7.6, DIG. 2, DIG. 28; 250/216, 566, 568, 570, 571, 578, 239

[56] References Cited

UNITED STATES PATENTS

| | | | |
|---|---|---|---|
| 2,712,611 | 7/1955 | Nyman | 250/239 |
| 2,864,886 | 12/1958 | Lemmon | 178/DIG. 2 |
| 3,006,992 | 10/1961 | Nakagawa et al. | 178/6.6 B |
| 3,214,596 | 10/1965 | Schwedt, Jr. et a. | 250/239 |
| 3,341,710 | 9/1967 | Cade | 250/239 |
| 3,466,451 | 9/1969 | Hanchett, Jr. | 178/7.1 |
| 3,561,846 | 2/1971 | Kingsland | 178/7.6 |
| 3,684,889 | 8/1972 | Priessnetz et al. | 250/216 |

*Primary Examiner*—Raymond F. Cardillo, Jr.
*Attorney, Agent, or Firm*—Ronald J. LaPorte; Peter S. Lucyshyn

[57] ABSTRACT

An optical assembly for a stencil making device employed for scanning an original document to provide a light image of indicia thereon to a photomultiplier tube which converts the light image into electrical signals includes a housing taking the form of a block having at least one aperture or channel therein for receiving a lamp. A second channel extends at right angles from the first channel toward a predetermined wall of the block. The last-mentioned channel opens at the wall so that light from the lamp passes outwardly of the second channel onto the original document positioned adjacent the wall. A third channel extends into the block adjacent the second channel. A lens in the last-mentioned channel focuses reflected light images of the indicia through the third channel to the end of an optical fiber which carries the image to the photomultiplier tube. The dimension of the cross-sectional end of the optical fiber determines the scan area.

5 Claims, 4 Drawing Figures

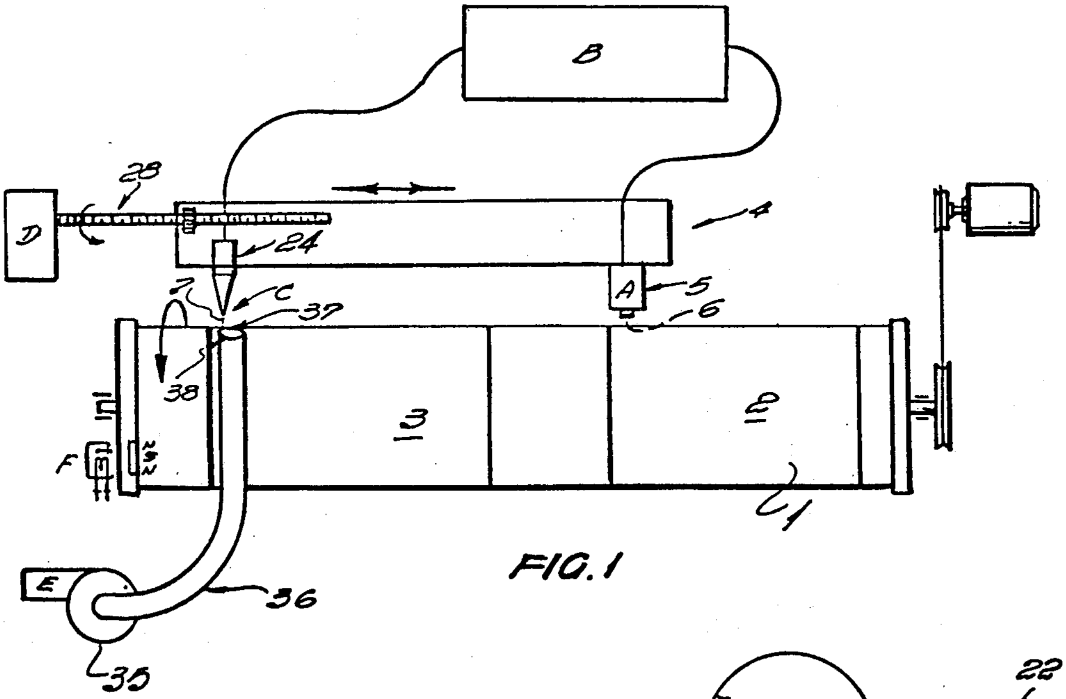
FIG. 1
FIG. 2
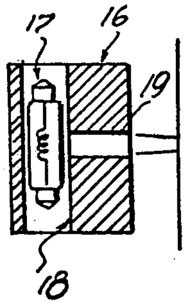
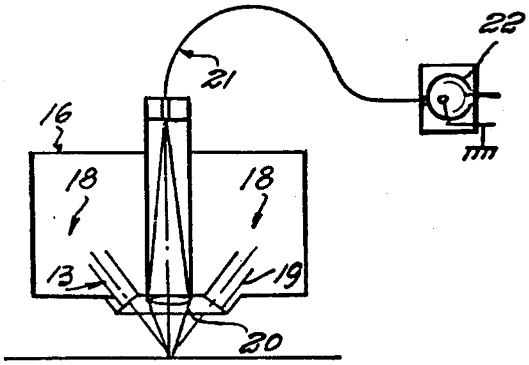
FIG. 3
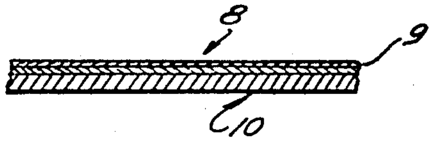
FIG. 4

DEVICES FOR THE COPYING OF IMAGES BY SEQUENTIAL SWEEPING

BACKGROUND OF THE INVENTION

The present invention refers to improvements in devices used for copying images by sequential sweeping, and it has as its main object a new structure of the optical system which is a part of those devices.

Conventionally, devices of the above-mentioned type used for producing stencil reproductions of indicia provided on an original document include a rotating drum where there is placed on one side of the original to be copied, and in an adjacent position, the material which is to receive the image. Laterally to said cylinder or drum there is placed a movable structure which supports the optical system which records and transforms into electrical levels the various light and dark tones of a particular zone of the original.

On the same carrying system and forming a rigid unit, there is placed a wire or needle (stylus) which rests with some constant pressure on the image-receiving material. When the optical system registers a dark zone, there is applied to said wire a train of high frequency impulses, which perforates and darkens the sensitive material. The cylinder is made to rotate at a uniform speed, usually between 200 and 800 rpm, while the carrying system for the optical system and the wire moves slowly in a rectilinear direction parallel to the cylinder or drum. For each rotation of the cylinder, the carrying system moves forward one fraction of one millimeter, sweeping in that way, in a few minutes, all of the area of interest.

The equipment provided up until now has a limited field of use, because of the quality of the images reproduced. The most exploited field is the making of stencils for mimeographs.

The receiving sheet is a thin sheet of plastic material or of paper, which is perforated by dielectric disruption. Through those perforations there passes the ink to execute the printing.

The above system is also used to make matrices for offset, in which the electric arc perforates a thin hydrophilic layer, exposing a hydrophobic (water-repellent) layer which receives the ink.

There can be obtained black and white copies on sensitive material which is made up of a sheet of paper with a thin layer of plastic provided with a white pigment, which becomes perforated exposing under it a layer of plastic with conductive carbon. In this manner there are obtained copies showing great contrast, but that system is not competitive with more rapid systems such as Xerox or Electrofax.

The improvements of the optical system of the present invention make it possible to improve the quality of the stencil making system to such an extent that, not only does it widen the possibilities of the stencil for use with mimeograph machines and for offset matrices to fields having greater requirements, but make it competitive for the reproduction of photographic copies in place of silver bromide paper. Advantages realized with the present system are lower cost of copies, copies of relatively high quality and low cost of equipment.

The structure of optical systems known in the art includes at least one lamp the filament of which is concentrated through a pair of lenses onto the original document mounted on the cylinder. The illuminated diaphragm, is focused by means of another lens on a diaphgram, which has a small perforation which determines the size of the area being explored. The light which passes therethrough excites a photomultiplier. For the light levels available, the most common practice is to use a photomultiplying tube of a well known type. For proper functioning of that optical complex or arrangement, lamps must be used with filaments having a controlled position, and the alignment of the system must be accurately set to make the optical axes of the three lenses coincidental. To maintain the alignment, there is required a mounting system which supports the latter and does not transmit the heat of the lamps to the original as there would be produced thermal currents in its parameters. All of this results in a high cost of construction, and drawbacks in the use.

SUMMARY OF THE INVENTION

It is thus an object of the present invention to provide in stencil making apparatus of the type described heretofore, a new and improved optical system which overcomes the drawbacks mentioned and which provides the following advantages: the construction of the system can be accomplished with fewer parts or elements; i.e. the number of lenses, supports therefor, centering devices, etc., can be greatly reduced; good mechanical stability can be achieved; low cost lamps may be used as lamps with predeterminedly set filaments need not be employed, low cost lamps are used without sacrificing light distribution; and the photomultiplier tube used in conjunction with the assembly can be moved away from the assembly thereby removing any heat generated by the assembly to provide a more stable functioning of the photomultiplier.

Also in the structure under consideration, there is eliminated the coaxial cable conventionally necessary in prior art arrangements, to connect the photomultiplier tube to the electrical circuit. The latter in the subject invention is replaced by a flexible optical fiber, thus making it possible to obtain more accuracy since there are no electrical losses in capacity. As such, greater power in the engraving wire or needle can be provided without the conductors leading to it producing any regeneration in the photomultiplier connection.

All of this results in the advantage of easier access to the components of the optical structure, in a greater capacity, and finally in lower costs with greater functional efficiency.

Briefly, a preferred embodiment of the optical assembly according to the invention includes a housing taking the form of a block having at least one aperture or channel therein for receiving a low cost (such as an automotive type) lamp. A second channel is formed in the block perpendicular to the first-mentioned channel. This channel extends to a predetermined wall of the block at an angle with respect thereto. A third channel extending substantially perpendicular to the last-mentioned wall extends through the block also. A lens is placed in the third aperture near the predetermined wall. Light from the lamp is passed through the second channel to an original document positioned in a plane parallel to and adjacent the wall. A light image is reflected from the original through the second channel and is focused by the lens onto the end of a light carrying fiber which is attached at the opposite end to a photomultiplier.

DESCRIPTION OF THE DRAWINGS

In order for the invention to be well understood and executed without any difficulties, it has been represented in its preferred form of execution in the attached drawing in which:

FIG. 1 is a schematic view which shows a device for the copying of images by sequential sweeping, fitted with an optical system improved according to the invention;

FIG. 2 is a sectional view of one of the components of the structure of the optical system corresponding to the improvements of the invention;

FIG. 3 is a diagrammatical view which shows the structure of the optical system which corresponds to the improvements of the invention; and FIG. 4 is a sectional view which illustrates the form of the copying material used with the device of FIG. 1.

DETAILED DESCRIPTION OF THE DRAWINGS

In all of the figures, the same references indicate equal or corresponding parts of the instrumentalities shown. The stencil making device comprises a rotating cylinder or drum 1 where there is placed on one side the original 2 to be copied and in an adjacent manner the image-receiving material 3. When the optical system A registers a dark zone, there is applied to said wire or needle a train of high frequency impulses, which wire perforates or darkens the sensitive material 3.

The imaging-receiving material 3 is constituted by a sheet of paper 10 with a thin layer of plastic fitted with a white pigment 8, which becomes perforated exposing under same a layer of plastic with conductive carbon 9.

An electronic ciruit B includes a video amplifier, a modulator usually of the bridge type, of diodes, and of a power oscillator (not shown). There are added controls for contrast, for tone, arc intensity, and a milliammeter which is used as a reference to regulate the various parameters. The modulation in all cases in sinusoidal carrier amplitude.

Complex C called the burning complex, includes a piece of wire 7, having a high resistance to wear, mounted on a small elastic plate 24. The wire comes into contact with the cylinder only during the engraving process. Normally it is withdrawn to aid in the loading of the paper as well as to remain protected.

A transportation mechanism for the movable structure D comprises a screw 28 which when slowly rotating, displaces structure 4. An extractor for the waste (burned material) released by the engraving process, extractor E, has a small centrifuge turbine 35, operated by a high speed motor with a flexible duct 36. The extractor absorbs the residues from the engraving zone 37.

Sensor F completes the device. It is formed by apparatus which can start and interrupt the engraving function which determines when the wire or stylus falls onto the sensitive material once the cylinder has reached its required burning speed. The sensor also cuts off the current to the wire each time the latter passes over the cylinder zone where the ends of the sensitive material are attached. This occurs when the cylinder starts and after a few seconds during which it accelerates there is connected by hand or with a timer the engraving current. For its part, the cutting off of the current is obtained with a mechanical switch fitted to the shaft of the cylinder.

The improvements according to the present invention, which refer to the optical system A are realized by the combination of a large housing in the form of a block 16 having channels 18 therein. In the channels there are placed lamps 17, preferably of the tubular type. The lamps 17, as mentioned heretofore can be inexpensive ones such as low cost automotive lamps. The walls of each channels 18 in which the lamps are mounted, reflect the light emitted from the lamps. The light passes through channels 19 also formed in block 16 at substantially 90° with respect to channels 18. The channels 19 through the multiple reflections on their walls, guide the light rays with little loss or dispersion. The channels 19 extend at an angle from one wall of the block on opposite sides of a centrally located lens 20. Light passes from channels 19 onto the original document to be copied and; is reflected from the indicia of the original document through the lens 20. The central lens 20 focuses the light image reflected from the original through another channel extending completely through the block 16 to the end of an optical fiber 21 which, with its circular cross-section determines the reading area. A photomultiplier 22 is at the other end of the flexible optical fiber, to convert the light into electrical signals. Use of the fiber 21 makes it possible to mount the photomultiplier near associated circuitry while only the optical system moves.

What I claimed is:

1. A device for copying indicia from an original document onto recording material to produce a stencil for reproducing copies therefrom, by scanning the original document and burning the image in accordance therewith into the recording material including a support for the original and the stencil recording material, optical means for scanning the original, means for converting a light image produced by said optical means into electrical signals and means coupled electrically to said converting means for burning said image into said stencil recording material in accordance with said signals, wherein said optical means includes in combination:

housing means defining first and second channels, the second channel being cylindrically shaped with a light reflecting wall and extending inwardly of said housing from a first outer wall at a predetermined angle with respect thereto, adjacent which an original document is placed for copying, said second channel intersecting said first channel transversely with respect thereto, lamp means mounted in said first channel, said second channel being open throughout the length thereof between said lamp and said document so that light from said lamp passes unfocused from said lamp to said document, at least a portion of said light being reflected by said channel means said housing mans defining a third channel adjacent said second channel extending from said first outer wall into said housing substantially perpendicular to the plane of said outer wall, light focusing means and light receiving means mounted in said third channel, said light receiving means being coupled to said converting means, said second and third channels being positioned relative to each other so that said unfocused light from said lamp passes through said second channel onto said indicia of said original document and the light image of said indicia passes through said third channel and is focused onto said light receiving means.

2. Optical means as claimed in claim 1 wherein said first and second channels intersect at an angle of substantially 90°.

3. Optical means as claimed in claim 1 wherein said focusing means comprises a lens, the optical axis of which is substantially perpendicular to the plane of said outer wall.

4. Optical means as claimed in claim 3 wherein said light receiving means comprises an optical light carrying fiber, one end of which is mounted in said third channel along the optical axis of said lens, said fiber receiving and carrying the light image of indicia from said original to said converting means, said one end of said fiber defining the scanning area of said document.

5. Optical means as claimed in claim 4 wherein said fiber has a circular cross-section defining a predetermined document scanning area.

* * * * *

UNITED STATES PATENT OFFICE
CERTIFICATE OF CORRECTION

Patent No. 4,001,495 Dated January 4, 1977

Inventor(s) Julio G. Tauszig

It is certified that error appears in the above-identified patent and that said Letters Patent are hereby corrected as shown below:

Column 1, line 68, should read -- zone is focused by means of another lens on a --.

Column 3, line 40, should read -- ous parameters. The modulation in all cases is sinusoi- --.

Column 4, line 55 should read -- flected by said channel wall, said housing means --.

Signed and Sealed this

Seventeenth Day of May 1977

[SEAL]

*Attest:*

RUTH C. MASON
*Attesting Officer*

C. MARSHALL DANN
*Commissioner of Patents and Trademarks*